United States Patent
Sun et al.

(10) Patent No.: US 8,849,338 B2
(45) Date of Patent: Sep. 30, 2014

(54) METHOD FOR ADJUSTING CHANNELS IN COGNITIVE WIRELESS COMMUNICATION, AND COGNITIVE WIRELESS COMMUNICATION SYSTEM CAPABLE OF IMPLEMENTING THE METHOD

(75) Inventors: Chen Sun, Tokyo (JP); Yohannes Alemseged Demessie, Tokyo (JP); Ha Nguyen Tran, Tokyo (JP); Hiroshi Harada, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 394 days.

(21) Appl. No.: 13/384,453

(22) PCT Filed: Jul. 16, 2010

(86) PCT No.: PCT/JP2010/004618
§ 371 (c)(1),
(2), (4) Date: Feb. 15, 2012

(87) PCT Pub. No.: WO2011/007581
PCT Pub. Date: Jan. 20, 2011

(65) Prior Publication Data
US 2012/0135770 A1 May 31, 2012

(30) Foreign Application Priority Data
Jul. 17, 2009 (JP) .................. 2009-169434

(51) Int. Cl.
*H04B 7/00* (2006.01)
*H04W 16/14* (2009.01)
*H04W 72/08* (2009.01)

(52) U.S. Cl.
CPC ............ *H04W 16/14* (2013.01); *H04W 72/082* (2013.01)
USPC ........ 455/522; 455/501; 455/504; 455/422.1; 455/507; 455/515

(58) Field of Classification Search
CPC ............................ H04W 72/082; H04W 16/14
USPC .................. 455/509, 522, 501, 504, 442, 507
See application file for complete search history.

(56) References Cited

U.S. PATENT DOCUMENTS

| | | | |
|---|---|---|---|
| 8,514,789 B2 * | 8/2013 | Akchurin et al. | 370/329 |
| 2009/0117914 A1 * | 5/2009 | Kwon et al. | 455/454 |
| 2009/0258603 A1 * | 10/2009 | Ghaboosi et al. | 455/68 |

FOREIGN PATENT DOCUMENTS

| | | |
|---|---|---|
| EP | 2 237 588 | 10/2010 |
| WO | 2008/119381 | 10/2008 |
| WO | 2009/084465 | 7/2009 |

OTHER PUBLICATIONS

English translation of the International Search Report issued for corresponding International Application No. PCT/JP2010/004618 mailed Oct. 12, 2012.
Alemseged Yohannes D. et al, "Auxiliary Control Channel for Spectrum Sensing in Cognitive Radio Systems", IEICE Technical Report, Jul. 22, 2009, vol. 109 No. 155, pp. 139 to 144.
M. Inoue et al., "Novel Out-of-Band Signaling for Seamless Interworking between Heterogeneous Networks", IEEE Wireless Commun., vol. 11, No. 2, Apr. 2004, p. 56-63.

* cited by examiner

*Primary Examiner* — Sanh Phu
(74) *Attorney, Agent, or Firm* — Myers Wolin, LLC

(57) ABSTRACT

There is disclosed a channel adjusting method capable of suppressing the occurrence of interference between a cognitive pilot channel (CPC) and an auxiliary control channel (ACS) in cognitive wireless communications. According to the channel adjusting method for use in cognitive wireless communications, initially, a connection using a cognitive pilot channel (CPC) is set up. Thereafter, it is determined whether or not a spectrum sensing channel (ACS) is to be utilized. If yes, it is then determined whether or not any interference occurs between the spectrum sensing channel (ACS) and the set-up cognitive pilot channel (CPC). This allows an adjustment to be performed such that no interference occurs between the cognitive pilot channel (CPC) and the spectrum sensing channel (ACS).

2 Claims, 4 Drawing Sheets

FIG. 3
FIG. 3(a)
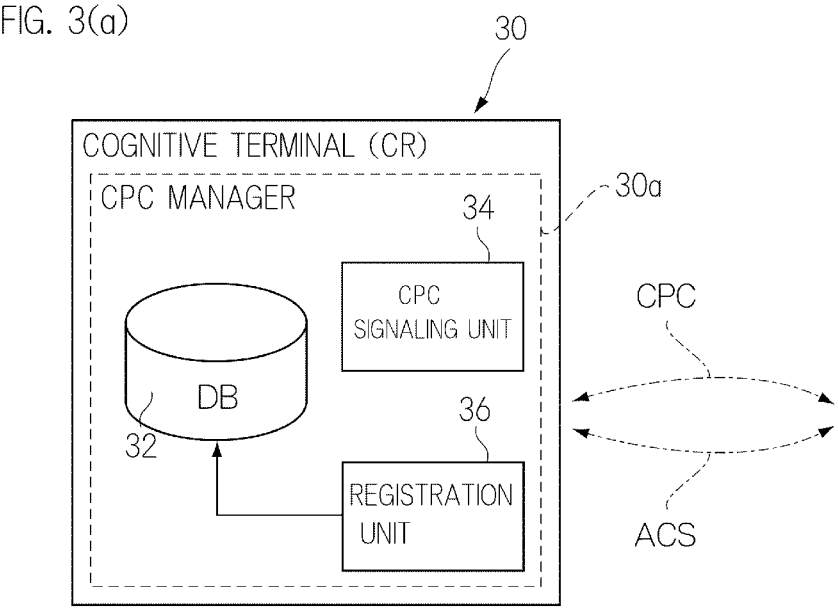
FIG. 3(b)
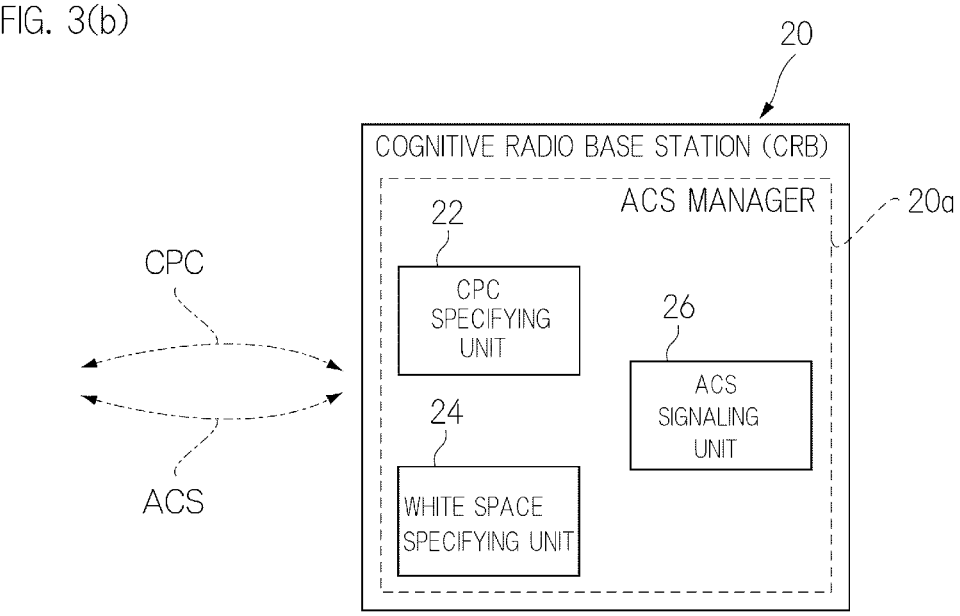

Fig. 4
Fig. 4(a)
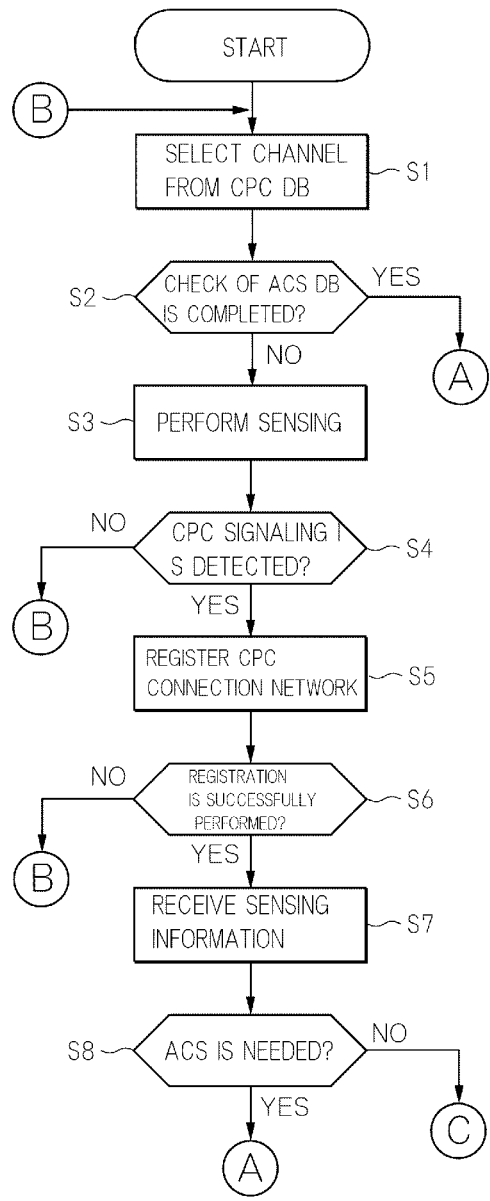
Fig. 4(b)
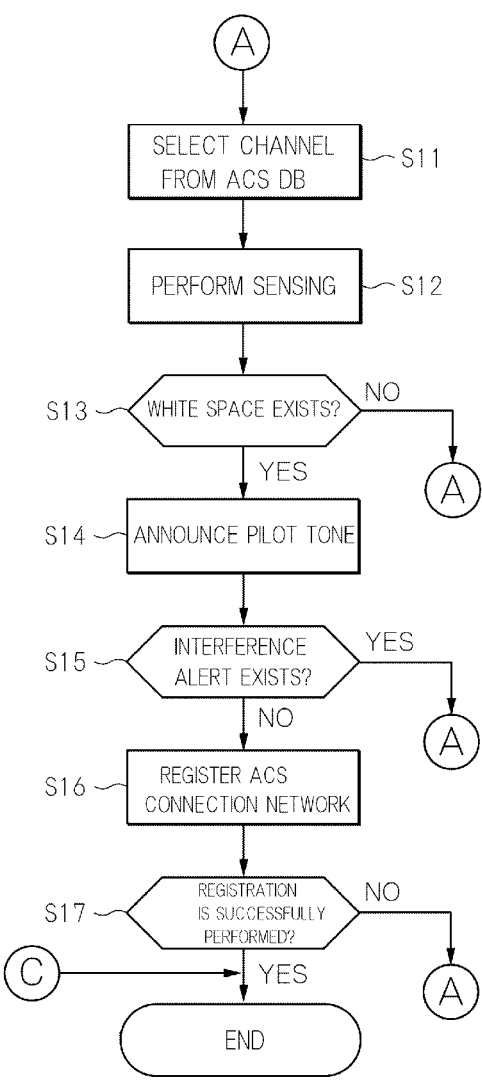

METHOD FOR ADJUSTING CHANNELS IN COGNITIVE WIRELESS COMMUNICATION, AND COGNITIVE WIRELESS COMMUNICATION SYSTEM CAPABLE OF IMPLEMENTING THE METHOD

CROSS REFERENCE TO RELATED APPLICATIONS

The present disclosure is a national phase filing under 35 U.S.C. §371 of International Patent Application No. PCT/JP2010/004618 filed on Jul. 16, 2010, which claims priority to Japanese Patent Application No. 2009-169434 filed on Jul. 17, 2009, the disclosures of each of which are expressly incorporated herein by reference in their entireties.

TECHNICAL FIELD

The present invention relates to a method for adjusting channels in cognitive wireless communication and a cognitive wireless communication system that can implement the method, particularly to a method for adjusting a cognitive pilot channel (CPC) and an auxiliary control channel for spectrum sensing (ACS) in the cognitive wireless communication and a cognitive wireless communication system that can implement the method.

BACKGROUND ART

Cognitive wireless communication in which a dynamic spectrum access (DSA) is utilized can be cited as an example of wireless communication. In a cognitive wireless communication system (CRS), a procedure for setting up data communication is as follows. In the cognitive wireless communication system, spectrum sensing is performed to a whole specific wireless frequency domain. Then, a spectrum utilization situation is analyzed based on the spectrum sensing result. A frequency domain (white space) that can be utilized in the data communication of the cognitive wireless communication is fixed based on the analysis result.

In the setup procedure, it is necessary that various pieces of sensing information and sensing control information be exchanged between components of cognitive wireless communication system. At this point, a physical element constituting the cognitive wireless communication system includes a cognitive terminal (CT), a cognitive radio base station (CRB), and a spectrum sensor. The cognitive terminal (CT) and the cognitive radio base station (CRB) can transmit and receive information through a wireless network.

A cognitive pilot channel (CPC) is known as a channel that connects the wireless network (network side) and the cognitive terminal (CT) or the cognitive radio base station (CRB) (terminal side) (for example, see Non-Patent Document 1). The cognitive pilot channel (CPC) is a channel in which the network side and the terminal side are connected over a wide receivable area by utilizing a low frequency band.

It is conceivable that the sensing information and the sensing control information are exchanged on the terminal side (for example, between an in-cognitive-terminal (that is, built-in type) spectrum sensor and a cognitive engine (CE)). It is also conceivable that the sensing information and the sensing control information are exchanged between a stand-alone (that is, independently-operated) spectrum sensor that is spatially divided in the cognitive wireless communication system and another cognitive terminal. The sensing information and the sensing control information are also exchanged between the cognitive radio base stations (CRB), between the cognitive radio base station (CRB) and the cognitive terminal (CT), and between the spectrum sensors. Hereinafter, the channel that is used to exchange the sensing information and the sensing control information between the cognitive terminals (that is, between the terminals that do not exist on the network side) is referred to as an auxiliary control channel for spectrum sensing (ACS).

However, adjacent channel interference is generated in the case that a frequency domain of the cognitive pilot channel (CPC) and a frequency domain of the auxiliary control channel for spectrum sensing (ACS) overlap each other. Particularly, a failure is generated in a dynamic spectrum access when the interference is generated in a cycle in which spectrum sensing is performed. Additionally, competition is generated when the sensing information from the cognitive pilot channel (CPC) and the sensing information from the auxiliary control channel (ACS) simultaneously reach one cognitive terminal (CT).

PRIOR ART DOCUMENT

Non-Patent Document

Non-Patent Document 1: M. Inoue et al., "Novel Out-of-Band Signaling for Seamless Interworking between Heterogeneous Networks", IEEE Wireless Commun., vol. 11, No. 2, p. 56-63, April 2004

SUMMARY OF INVENTION

Technical Problem

A first object of the invention is to provide a channel adjusting method in which the sensing information and the sensing control information can securely be exchanged by suppressing the generation of the interference between the cognitive pilot channel (CPC) and the auxiliary control channel (ACS) in the cognitive wireless communication, and a cognitive wireless communication system that can implement the channel adjusting method.

A second object of the invention is to provide a channel adjusting method in which the generation of the competition is suppressed between the utilization of the cognitive pilot channel (CPC) and the utilization of the auxiliary control channel (ACS) in the cognitive wireless communication whereby the sensing information and the sensing control information can smoothly be exchanged by effectively utilizing the wireless resource, and a cognitive wireless communication system that can implement the channel adjusting method.

Solution to Problem

The invention relates to a channel adjusting method in cognitive wireless communication. The step of setting up connection through a cognitive pilot channel (CPC), the step of determining whether a spectrum sensing channel (ACS) is utilized after the setup of the cognitive pilot channel (CPC), and the step of determining whether the spectrum sensing channel (ACS) and the set-up cognitive pilot channel (CPC) interfere with each other when the spectrum sensing channel (ACS) is utilized as a result of the determination step are performed in the channel adjusting method.

Therefore, the cognitive pilot channel (CPC) and the spectrum sensing channel (ACS) are adjusted so as not to interfere with each other. The setup of the cognitive pilot channel (CPC) and the setup of the auxiliary control channel (ACS)

are sequentially performed, so that the competition between the cognitive pilot channel (CPC) and the auxiliary control channel (ACS) can be avoided. As a result, not only the sensing information and the sensing control information can securely be exchanged, but also the sensing information and the sensing control information can smoothly be exchanged by effectively utilizing the wireless resource.

In another aspect of the invention, the setting up step includes the step of registering information on the set-up cognitive pilot channel (CPC) in a database. In this case, the channel adjusting method further includes the step of registering information on the utilized spectrum sensing channel (ACS) in the database. Therefore, the information on the cognitive pilot channel (CPC) and the information on the auxiliary control channel (ACS) are securely managed, so that the competition between the cognitive pilot channel (CPC) and the auxiliary control channel (ACS) can be avoided.

In another aspect of the invention, a wireless communication system that conducts the cognitive wireless communication between plural cognitive terminals (CT) includes a cognitive radio base station (CRB) that controls the cognitive terminal (CT). At this point, the cognitive radio base station (CRB) includes an ACS manager that manages the utilized spectrum sensing channel (ACS), and at least one cognitive terminal (CT) in the plurality of cognitive terminals (CT) includes a cognitive pilot channel (CPC) that manages the cognitive pilot channel (CPC).

The CPC manager performs the step of registering information on the cognitive pilot channel (CPC) in the database, and the step of registering information on the spectrum sensing channel (ACS) in the database. The ACS manager performs the step of determining whether the spectrum sensing channel (ACS) is utilized, and the step of determining whether the interference is generated. In this case, the channel adjusting method further includes the step of causing the ACS manager to provide information necessary to be registered in the database. Therefore, the information on the cognitive pilot channel (CPC) and the information on the auxiliary control channel (ACS) can securely be managed while the information is smoothly exchanged between the CPC manager and the ACS manager.

In another aspect of the invention, in at least one cognitive terminal (CT) in the plural cognitive terminals (CT) and the cognitive radio base station (CRB) are disposed in a partition having a size in which identical location specifying information can be acquired through the cognitive pilot channel (CPC). Therefore, the information on the cognitive pilot channel (CPC) is shared.

The invention is also relates to a cognitive wireless communication system. The cognitive wireless communication system is a wireless communication system that can implement a channel adjusting method in cognitive wireless communication. The system includes means for setting up connection through a cognitive pilot channel (CPC), means for determining whether a spectrum sensing channel (ACS) is utilized after the setup of the cognitive pilot channel (CPC), and means for determining whether the spectrum sensing channel (ACS) and the set-up cognitive pilot channel (CPC) interfere with each other when the spectrum sensing channel (ACS) is utilized as a result of the determination step. Therefore, the system can obtain the same effect as the above-described effect.

Advantageous Effects of Invention

Accordingly, the invention can provide the channel adjusting method in which the sensing information and the sensing control information can securely be exchanged by suppressing the generation of the interference between the cognitive pilot channel (CPC) and the auxiliary control channel (ACS) in the cognitive wireless communication, and the cognitive wireless communication system that can implement the channel adjusting method.

Additionally, the invention can provide the channel adjusting method in which the generation of the competition is suppressed between the utilization of the cognitive pilot channel (CPC) and the utilization of the auxiliary control channel (ACS) in the cognitive wireless communication whereby the sensing information and the sensing control information can smoothly be exchanged by effectively utilizing the wireless resource, and the cognitive wireless communication system that can implement the channel adjusting method.

BRIEF DESCRIPTION OF DRAWINGS

FIG. 3(a) and FIG. 3(b) are block diagrams illustrating detailed configurations of a cognitive radio base station (CRB) 20 and a cognitive terminal (CT) 30 in FIG. 1, FIG. 3(a) illustrates functional blocks of the cognitive radio base station (CRB) 20, and FIG. 3(b) illustrates functional blocks of the cognitive terminal (CT) 30.

FIG. 4(a) and FIG. 4(b) are flowcharts illustrating a processing procedure of a channel adjustment method performed by the cognitive wireless communication system of FIG. 1, FIG. 4(a) illustrates a stage at which connection through the cognitive pilot channel (CPC) is set up, and FIG. 4(b) illustrates a stage at which an auxiliary control channel (ACS) is set up.

DESCRIPTION OF EMBODIMENTS

Hereinafter, an embodiment of the invention will be described with reference to the drawings. The embodiment is described only by way of example, and it is noted that those skilled in the art can properly make modifications within a trivial range.

Figure 1:
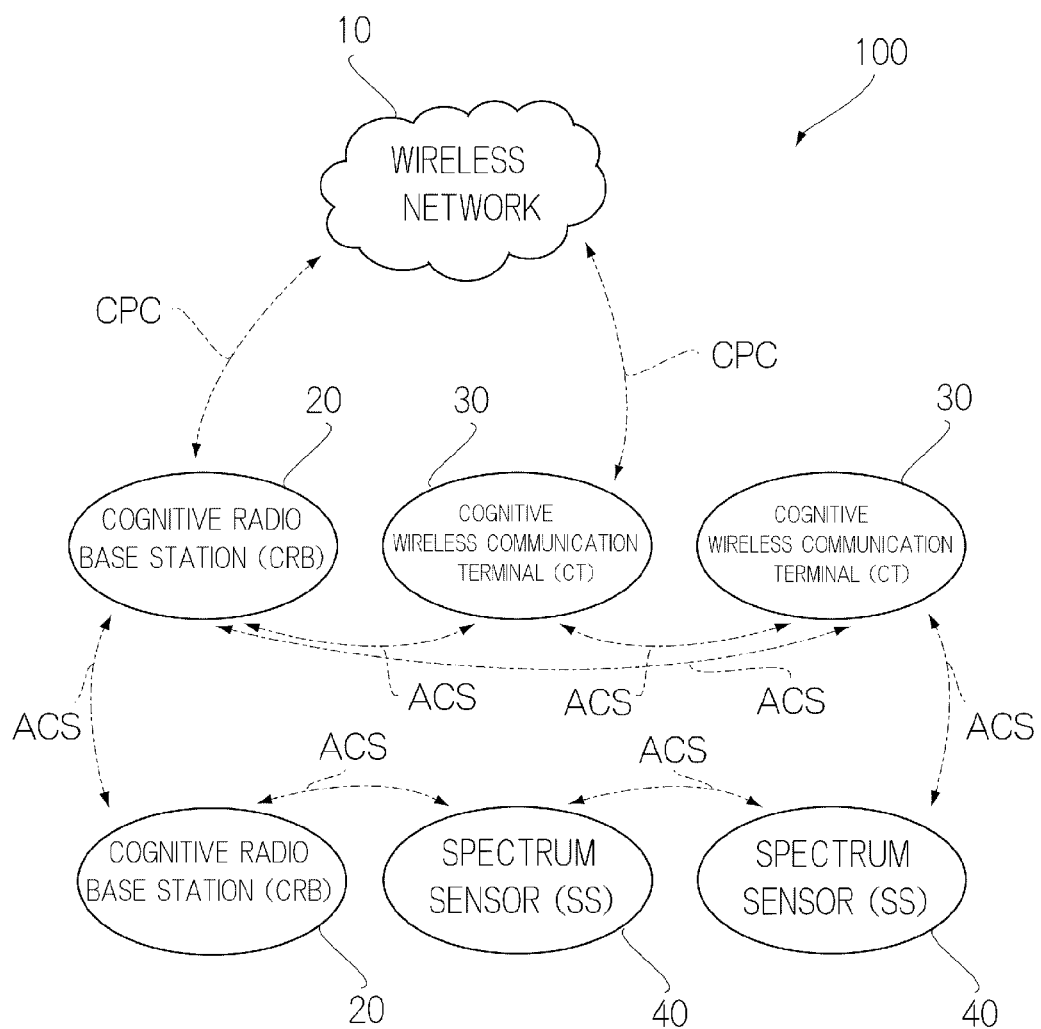
FIG. 1 is a view schematically illustrating a configuration of a cognitive wireless communication system of the invention.

FIG. 1 is a block diagram schematically illustrating a configuration of a wireless communication system of the invention.

A cognitive wireless communication system 100 of FIG. 1 includes a wireless network 10, and also includes two cognitive radio base stations (CRB) 20, two cognitive terminals (CT) 30, and two spectrum sensors (SS) 40 as physical elements. The cognitive wireless communication system 100 may include plural cognitive radio base stations (CRB) 20. The cognitive wireless communication system 100 may include at least one cognitive radio base station (CRB) 20, at least one cognitive terminal (CT) 30, and at least one spectrum sensors (SS) 40. However, in order to transmit and receive data in cognitive wireless communication, it is necessary that the cognitive wireless communication system 100 include at least two cognitive terminals (CT) 30.

The wireless network 10 provides a wireless communication environment between the cognitive radio base station (CRB) 20 and the cognitive terminal (CT) 30 or among the plural cognitive terminals (CT).

The cognitive radio base station (CRB) 20 is a control device that controls the cognitive wireless communication in the cognitive wireless communication system 100, specifically the cognitive radio base station (CRB) 20 controls the cognitive terminal (CT) located in a neighborhood thereof. The cognitive radio base station (CRB) 20 is configured to be capable of conducting wireless communication with another wireless communication device. For example, the cognitive radio base station (CRB) 20 receives instruction information through the wireless network 10, receives spectrum information from the cognitive terminal (CT) 30 to analyze the spectrum information, and transmits spectrum control information to the cognitive terminal (CT) 30.

The cognitive terminal (CT) 30 is a wireless communication device that can conduct wireless communication. The cognitive terminal (CT) 30 is a device in which at least one of logical elements (a cognitive engine (CE), a spectrum sensor, and a data archive (DA)) constituting the cognitive wireless communication system 100 is incorporated. Specifically, four kinds of devices, namely, a device that includes only the cognitive engine (CE), a device that includes the cognitive engine (CE) and the data archive (DA), a device that includes the cognitive engine (CE) and the spectrum sensor, and a device that includes the cognitive engine (CE), the data archive (DA), and the spectrum sensor are conceivable as the cognitive terminal (CT) 30. Similarly four kinds of devices are conceivable as the cognitive radio base station (CRB).

In the example illustrated in FIG. 1, the spectrum sensor (SS) 40 is a stand-alone type. As described above, the spectrum sensor (SS) 40 may be incorporated in the cognitive terminal (CT) 30, or incorporated in the cognitive radio base station (CRB) 20.

In the cognitive wireless communication system 100, before the cognitive wireless communication is setup (established), the physical elements of the cognitive wireless communication system 100 form channels so as to be connected to one another as illustrated by an alternate long and short dash line of FIG. 1. Specifically, a cognitive pilot channel (CPC) and an auxiliary control channel for spectrum sensing (ACS) are formed. The formed channels are used in processing of FIG. 4.

The cognitive pilot channel (CPC) is a channel that is formed between the devices located relatively distant from each other, such as between the wireless network 10 and the cognitive radio base station (CRB) 20 and between the wireless network 10 and the cognitive terminal (CT) 30. Usually the cognitive pilot channel (CPC) has a low data rate, and is used to transmit only basic information.

Figure 2:
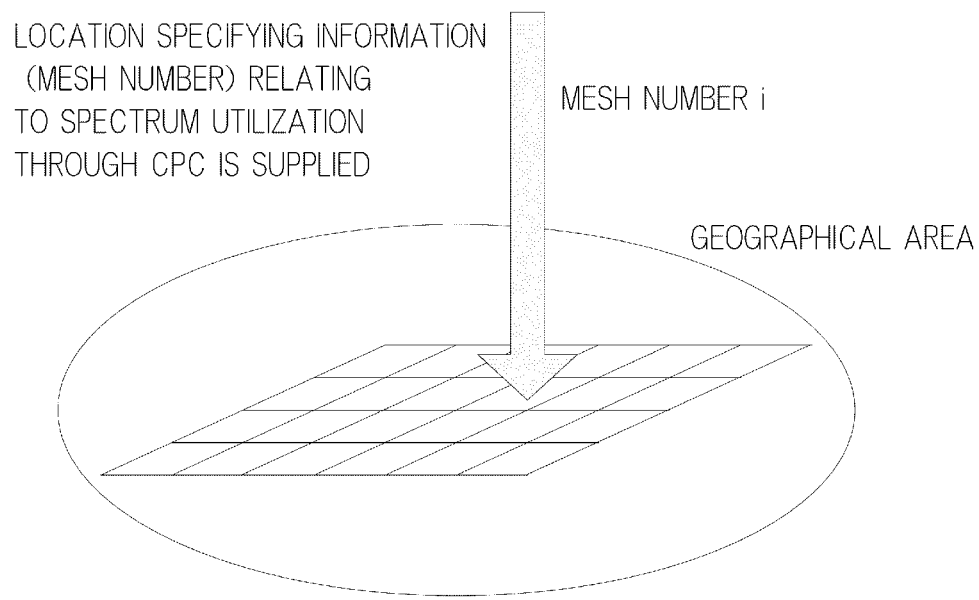
FIG. 2 is a view schematically illustrating a cognitive pilot channel (CPC) in FIG. 1.

At this point, in the cognitive wireless communication system 100, a communication area (geographical area) is partitioned into a matrix shape, namely, a mesh shape as illustrated in FIG. 2. In the embodiment, location specifying information is expressed by a mesh number (#) in order to specify each partition (cell). Information relating to spectrum utilization can be correlated with the location specifying information. The location specifying information is supplied as the information relating to the spectrum utilization to the cognitive radio base station (CRB) 20 and the cognitive terminal (CT) 30, which are located in each partition, through the cognitive pilot channel (CPC). In other words, the cognitive radio base station (CRB) 20 and the cognitive terminal (CT) 30 can acquire the information relating to the spectrum utilization by utilizing the cognitive pilot channel (CPC). The plural wireless communication devices may be disposed in one partition. In this case, the plural wireless communication devices come close to each other. In the example illustrated in FIG. 1, the cognitive radio base station (CRB) 20 and the cognitive terminal (CT) 30 are disposed in one partition (cell) of the cognitive pilot channel (CPC).

The auxiliary control channel (ACS) is a channel that is formed between the physical elements located relatively close to each other, such as between the cognitive radio base station (CRB) 20 and the cognitive terminal (CT) 30 and between the cognitive terminals (CT). The auxiliary control channel (ACS) is formed in a sensing cycle, and mainly used in the sensing cycle. For example, a frequency band of the auxiliary control channel (ACS) is set to a frequency slot (wireless channel) that is previously fixed in an Industry-Science-Medical band (ISM band). Sensing information and sensing control information can be exchanged through the auxiliary control channel (ACS). Accordingly, in the cognitive wireless communication system 100, the cognitive radio base station (CRB) 20 and the cognitive terminal (CT) 30 are configured so as to be capable of sharing the sensing information and the sensing control information.

At this point, in the cognitive wireless communication system 100, the cognitive pilot channel (CPC) and the auxiliary control channel (ACS) exist together. Therefore, as described above, there is a possibility of generating the interference or the competition between the cognitive pilot channel (CPC) and the auxiliary control channel (ACS). In order to avoid the interference or the competition, it is conceivable to perform adjustment (coordinate) to the cognitive pilot channel (CPC) and the auxiliary control channel (ACS).

Therefore, in the embodiment, an ACS manager 20a is provided as a functional unit in the cognitive radio base station (CRB) 20, and a CPC manager 30a is provided as a functional unit in the cognitive terminal (CT) 30. The ACS manager 20a and the CPC manager 30a are described in detail later with reference to FIGS. 3(a) and 3(b). In the embodiment, the adjustment can be performed to the cognitive pilot channel (CPC) and the auxiliary control channel (ACS) by providing the ACS manager 20a and the CPC manager 30a.

FIGS. 3(a) and 3(b) are block diagrams illustrating detailed configurations of the cognitive radio base station (CRB) 20 and the cognitive terminal (CT) 30 in FIG. 1, FIG. 3(a) illustrates functional blocks of the cognitive radio base station (CRB) 20, and FIG. 3(b) illustrates functional blocks of the cognitive terminal (CT) 30.

As illustrated in FIG. 3(a), the ACS manager 20a of the cognitive radio base station (CRB) 20 includes a CPC specifying unit 22, a white space specifying unit 24, and an ACS signaling unit 26 as the functional blocks. The ACS manager 20a has a function of providing information on the auxiliary control channel (ACS) (information on a frequency domain and information on a utilization situation in a service area in the frequency domain) to (a database (DB) of) the CPC manager 30a.

The CPC specifying unit 22 is the functional block that that performs sensing in order to specify the existing cognitive pilot channel (CPC). The white space specifying unit 24 is the functional block that specifies a candidate (white space) of a wireless resource that can be utilized by the auxiliary control channel (ACS). The ACS signaling unit 26 is the functional block that performs ACS signaling. The ACS signaling unit 26 is the functional block that performs ACS signaling.

As illustrated in FIG. 3(b), the CPC manager 30a of the cognitive terminal (CT) 30 includes a database (DB) 32, a CPC signaling unit 34, and a registration unit 36 as the functional blocks. The database (DB) 32 is one in which plural frequency domains of the cognitive pilot channel (CPC) and the auxiliary control channel (ACS) are correlated with the utilization situation in the service area in each frequency domain. Therefore, pieces of information on the cognitive pilot channel (CPC) and the auxiliary control channel (ACS) can be provided (read). The CPC signaling unit 34 is the functional block that performs CPC signaling. The registration unit 36 is the functional block that registers (writes) information on a new user (user terminal) of the cognitive pilot channel (CPC) and information on the auxiliary control channel (ACS).

In the configuration illustrated in FIG. 3(a), the CPC manager 30a (cognitive terminal (CT) 30) includes the database 32. However, it is not necessary that the database 32 be provided in the CPC manager 30a (cognitive terminal (CT) 30), but any database disposed on the network may be used, or single or plural databases may be used. From the viewpoint of securing a write (registration) speed and a read speed, preferably the database 32 is provided in the ACS manager 20a, and more preferably the database 32 is provided in the CPC manager 30a.

Processing performed during the setup of the data communication in the cognitive wireless communication system 100 of FIG. 1 will be described below. Specifically, the processing corresponds to processing for exchanging the sensing information and the sensing control information with each other.

FIGS. 4(a) and 4(b) are flowcharts illustrating a processing procedure of the channel adjusting method implemented in the cognitive wireless communication system 100 of FIG. 1. The frequency bands of the cognitive pilot channel (CPC) and the auxiliary control channel (ACS) are efficiently and effectively managed by performing the channel adjustment illustrated in FIGS. 4(a) and 4(b).

The channel adjustment illustrated in FIGS. 4(a) and 4(b) can be considered while roughly divided into two stages. One is a stage at which the connection through the cognitive pilot channel (CPC) is set up as illustrated in FIG. 4(a), and the other is a stage at which auxiliary control channel (ACS) is set up as illustrated in FIG. 4(b). The processing performed by the ACS manager 20a will mainly be described below.

The stage at which the connection through the cognitive pilot channel (CPC) is set up will be described with reference to FIG. 4(a).

Referring to FIG. 4(a), in Step S1, the ACS manager 20a detects the cognitive pilot channel (CPC) to cause the CPC manager 30a to register the cognitive pilot channel (CPC) in the database 32. In the case that the processing in Step S1 is repeatedly performed, one cognitive pilot channel (CPC) is selected from the database 32. The specification of the cognitive pilot channel (CPC) enables the cognitive radio base station (CRB) 20 to receive policy information or a sensing request through the cognitive pilot channel (CPC).

In Step S2, it is determined whether a check of the database 32 is completed. When the check of the database 32 is completed as a result of the determination in Step S2 (YES in Step S2), the ACS manager 20a performs the sensing with the CPC specifying unit 22 (Step S3).

Then it is determined whether the CPC signaling unit 34 detects the CPC signaling (Step S4). When the CPC signaling is detected as a result of the determination (YES in Step S4), information on the connection through the cognitive pilot channel (CPC) in Step S1 is registered on the network (Step S5). Specifically, the information on the cognitive pilot channel (CPC) is registered in the database 32 of the CPC manager 30a. It is determined whether the registration processing is successfully performed (Step S6).

After the registration processing is successfully performed in Step S5 (YES in Step S6), the ACS manager 20a receives sensing information (Step S7). When the sensing information is received, it is determined whether the auxiliary control channel (ACS) is utilized (Step S8). When the auxiliary control channel (ACS) is not utilized (NO in Step S8), the processing is ended. Therefore, the setup of the connection through the cognitive pilot channel (CPC) is completed.

In FIG. 4(a), when the check of the database 32 is completed as a result of the determination in Step S2, processing of FIG. 4(b) is performed. When the auxiliary control channel (ACS) is utilized as a result of the determination in Step S8, the processing of FIG. 4(b) is also performed.

The step at which the auxiliary control channel (ACS) is set up will be described with reference to FIG. 4(b).

Referring to FIG. 4(b), in Step S11, the ACS manager 20a determines one auxiliary control channel (ACS) to be utilized from the plural candidates.

In Step S12, the ACS manager 20a performs the sensing with the white space specifying unit 24. It is determined whether the white space is found as a result of the sensing (Step S13). When the white space is not found (NO in Step S13), the flow returns to Step S11, and the pieces of processing in Steps S11 to S13 are repeated until the white space is found. When the white space is found (YES in Step S13), the ACS manager 20a announces a pilot tone as a probe signal in the white space (Step S14). The probe signal is sensed by the CPC manager 30a, and it is analyzed whether the probe signal generates the interference with the cognitive pilot channel (CPC). When the interference is generated, the CPC manager 30a issues an interference alert.

In Step S15, it is determined whether the interference alert is issued from the CPC manager 30a. When the interference alert is issued from the CPC manager 30a (YES in Step S15), the flow returns to Step S11, and the pieces of processing in Steps S11 to S15 are repeated.

On the other hand, when the interference alert is not issued from the CPC manager 30a (NO in Step S15), the information on the connection through the auxiliary control channel (ACS) is registered on the network (Step S16). Specifically, the information on the auxiliary control channel (ACS) in Step S11 is registered in the database 32 of the CPC manager 30a. It is determined whether the registration processing is successfully performed (Step S17). When the registration processing is not successfully performed in Step S16, the flow returns to Step S11, and the processing of FIG. 4(b) is repeated.

When the registration processing is successfully performed in Step S16 (YES in Step S17), the processing is ended. Therefore, the setup of the auxiliary control channel (ACS) is completed, and the auxiliary control channel (ACS) becomes a utilizable state.

A specific example of the embodiment (the pieces of processing of FIGS. 4(a) and 4(b)) will be described below.

In the specific example, the CPC manager 30a is provided in a legacy wireless resource manager. The ACS manager 20a is installed in the cognitive radio base station (CRB) 20.

When service of the cognitive radio base station (CRB) 20 is started, the ACS manager 20a in the cognitive radio base station (CRB) 20 detects the cognitive pilot channel (CPC), and registers the detected cognitive pilot channel (CPC) in the CPC manager 30a. Therefore, a wireless link in which the cognitive pilot channel (CPC) is utilized is set up.

Then the cognitive radio base station (CRB) 20 receives the policy information and the sensing request from the wireless network 10. Then the ACS manager 20a determines whether the utilization of the auxiliary control channel (ACS) is needed. When the utilization of the auxiliary control channel (ACS) is needed, a first example is the case that some cognitive terminals (CT) 30 that the cognitive pilot channel (CPC) cannot reach exist. A second example is the case that the pieces of sensing information are exchanged by utilizing the auxiliary control channel (ACS).

The ACS manager 20a starts the detection of the white space for the auxiliary control channel (ACS). When the auxiliary control channel (ACS) is tentatively set up, the ACS manager 20a transmits the policy information and the sensing request to the cognitive terminal (CT) 30 while announcing the ACS signaling. Finally the cognitive terminal (CT) 30 utilizes the auxiliary control channel (ACS) in order to exchange the sensing information.

As described in detail above, according to the embodiment, the following effect can be obtained.

According to the embodiment, the cognitive terminal (CT) can properly make a timing adjustment such that timing at which the cognitive pilot channel (CPC) is utilized and timing at which the auxiliary control channel (ACS) is utilized do not overlap each other. Therefore, the generation of the competition can be avoided. Therefore, the wireless resource can efficiently be utilized. As a result, the sensing information and the sensing control information can smoothly be exchanged.

According to the embodiment, because the registration is made in the database, the timing adjustment is made such that the frequency domain of the cognitive pilot channel (CPC) and the frequency domain of the auxiliary control channel (ACS) do not overlap each other, or the timing adjustment is made such that the timing at which the cognitive pilot channel (CPC) is utilized and the timing at which the auxiliary control channel (ACS) is utilized are deviated from each other even if the frequency domain of the cognitive pilot channel (CPC) and the frequency domain of the auxiliary control channel (ACS) overlap each other. Therefore, the generation of the interference and the generation of the competition can securely be avoided.

Particularly, because the setup of the auxiliary control channel (ACS) is not completed while the interference alert exists, the interference and the competition can be avoided between the cognitive pilot channel (CPC) and the auxiliary control channel (ACS).

The ACS manager 20a is provided in the cognitive radio base station (CRB) 20, and the CPC manager 30a is provided in the cognitive terminal (CT) 30, so that the wireless resource can be managed while divided into the network side and user terminal side, into the wide range and the narrow range, and into a long term and a short term. Therefore, a necessary determination can be made while the management of the divided wireless resource can be implemented.

The adjustment is easily made between the network and the terminal with respect to the allocation of the divided wireless resource.

The cognitive pilot channel (CPC) and the auxiliary control channel (ACS) are simultaneously utilized, so that the wireless communication range can be widened compared with the case that the cognitive pilot channel (CPC) or the auxiliary control channel (ACS) is singly used. As a result, the wireless resource can efficiently and effectively be utilized.

A beacon can be provided in order to synchronize the cognitive radio base station (CRB) 20 and the cognitive terminal (CT) 30. Therefore, the utilization of the auxiliary control channel (ACS) is further facilitated.

In the case that the cognitive pilot channel (CPC) is used, the adjustment is hardly made between cognitive nodes on the side of the cognitive terminal (CT) because of too many nodes. On the other hand, according to the embodiment, the adjustment load can be divided into the network side and the user side (the cognitive radio base station (CRB) 20, the cognitive wireless communication device, and the spectrum sensor).

According to the embodiment, information exchange can efficiently be organized on both the network side and the user side.

The information load can be reduced with respect to the cognitive pilot channel (CPC) by acquiring the detailed information through the auxiliary control channel (ACS). Therefore, a size of the partition (cell) of the cognitive pilot channel (CPC) can be enlarged to decrease the number of partitions. This is because the pieces of information, which are provided through the cognitive pilot channel (CPC) while having the pieces of location specifying information close to each other, are correlated. The same information can transmitted to the wide area by utilizing the small number of cognitive pilot channels (CPC). The specific information is transmitted to the narrow area using the auxiliary control channel (ACS), so that the number of cognitive pilot channel (CPC) to be utilized can be decreased.

In the cognitive pilot channel (CPC), the sensing information that is not change in the long term/wide area can be utilized. On the other hand, the auxiliary control channel (ACS) can be utilized in order to transmit the frequency change information to the narrow area.

The ACS manager 20a can provide the synchronous information for the spectrum sensor. The ACS manager 20a can open the utilization of the auxiliary control channel (ACS) in order that another component can utilize the data communication channel when the sensing information or the sensing control information is not transmitted.

An option to notify the user of the information can be provided to many users when the cognitive pilot channel (CPC) is utilized, and the sensing information can be provided to the few users when the auxiliary control channel (ACS) is utilized.

INDUSTRIAL APPLICABILITY

The invention is suitably applied to the field of the wireless communication, particularly to the field of the cognitive wireless communication.

DESCRIPTION OF REFERENCE SIGNS 10 wireless network
20 cognitive radio base station (CRB)
20a ACS manager
22 CPC specifying unit
25 white space specifying unit
26 ACS signaling unit
30 cognitive terminal (CT)
30a CPC manager
32 CPC database (DB)
34 CPC signaling unit
36 registration unit
40 spectrum sensor (SS)
100 cognitive wireless communication system

The invention claimed is:

1. A method for adjusting a channel in cognitive wireless communication, comprising the steps of:
setting up connection through a cognitive pilot channel (CPC);
determining whether a spectrum sensing channel (ACS) is utilized after the setup of the cognitive pilot channel (CPC); and
determining whether the spectrum sensing channel (ACS) and the set-up cognitive pilot channel (CPC) interfere with each other when the spectrum sensing channel (ACS) is utilized as a result of the determination step, whereby the cognitive pilot channel (CPC) and the spectrum sensing channel (ACS) are adjusted so as not to interfere with each other, wherein the setting up step includes the step of registering information on the set-up cognitive pilot channel (CPC) in a database, and the channel adjusting method further comprises the step of registering information on the utilized spectrum sensing channel (ACS) in the database, wherein a wireless communication system that conducts the cognitive wireless communication between a plurality of cognitive terminals (CT) includes a cognitive radio base station (CRB) that controls the cognitive terminal (CT), the cognitive radio base station (CRB) includes an ACS manager that manages the utilized spectrum sensing channel (ACS), at least one cognitive terminal (CT) in the plurality of cognitive terminals (CT) includes a cognitive pilot channel (CPC) that manages the cognitive pilot channel (CPC), the CPC manager performs the steps of:

registering information on the cognitive pilot channel (CPC) in the database; and registering information on the spectrum sensing channel (ACS) in the database, the ACS manager performs the steps of:

determining whether the spectrum sensing channel (ACS) is utilized; and determining whether the interference is generated, and the channel adjusting method further comprising the step of causing the ACS manager to provide information necessary to be registered in the database by the CPC manager.

2. The channel adjusting method according to claim 1, wherein at least one cognitive terminal (CT) in the plurality of cognitive terminals (CT) and the cognitive radio base station (CRB) are disposed in a partition having a size in which identical location specifying information can be acquired through the cognitive pilot channel (CPC).

\* \* \* \* \*